United States Patent [19]

Motozawa

[11] Patent Number: 5,156,417
[45] Date of Patent: Oct. 20, 1992

[54] SEAT BELT FORWARDING DEVICE

[75] Inventor: Yasuki Motozawa, Saitama, Japan

[73] Assignee: Honda Giken Kogyo Kabushiki Kaisha, Tokyo, Japan

[21] Appl. No.: 780,518

[22] Filed: Oct. 22, 1991

[30] Foreign Application Priority Data

Oct. 23, 1990 [JP] Japan ............................ 2-110666[U]
Oct. 23, 1990 [JP] Japan ............................ 2-110667[U]
Oct. 23, 1990 [JP] Japan ................................ 2-285348

[51] Int. Cl.$^5$ ...................... B60R 22/02; B60R 22/22
[52] U.S. Cl. .................................. 280/802; 297/469; 74/470
[58] Field of Search ...................... 280/801, 802, 808; 297/468, 469, 483, 481

[56] References Cited

U.S. PATENT DOCUMENTS 4,382,614  5/1983  Kubota .............................. 280/802
4,650,215  3/1987  Sasaki et al.

*Primary Examiner*—Karin L. Tyson
*Attorney, Agent, or Firm*—Armstrong & Kubovcik

[57] ABSTRACT

A seat belt forwarding device having a seat belt forwarding arm which has a base end pivotally mounted on a side of a rear part of a vehicle seat and a free end carrying an end of a seat belt, and can rotate between a waiting position in which the seat belt forwarding arm extends rearward from the seat and an operative position in which the seat belt forwarding arm extends forward along a side of the seat. The device comprises a damper unit and a power unit and an endless belt is used to transmit power therebetween. The damper unit comprises three coaxially and mutually rotatably arranged member, i.e., a driven unit which is driven by the power unit, an arm supporting member carrying the seat belt forwarding arm, and an intermediate member interposed therebetween to allow force to be transmitted from the driven member to the arm supporting member with necessary resiliency to ensure proper functioning of the seat belt forwarding arm.

10 Claims, 6 Drawing Sheets

1

SEAT BELT FORWARDING DEVICE

TECHNICAL FIELD

The present invention relates to a seat belt forwarding device for moving an end of a seat belt along a side of a vehicle seat between a waiting position behind the back rest of the vehicle seat and an operative position ahead of the back rest for the purpose of placing the end of the seat belt readily reachable by the vehicle occupant and facilitating the fastening of the seat belt.

BACKGROUND OF THE INVENTION

For the purpose of facilitating the fastening of the seat belt, various seat belt forwarding devices have been proposed. A seat belt forwarding device is particularly useful in two-door passenger cars because the retractor for the seat belt is located in a center pillar which is some distance behind the front seat, and it requires some efforts for the vehicle occupant to reach for an end of the seat belt which is also some distance behind the front seat. Further, the seat belt should not be in the way for a vehicle occupant who is to be seated in the rear seat.

U.S. Pat. No. 4,650,215 discloses a seat belt forwarding device having an arm pivotally mounted on a side of a front seat rear part at its base end and carrying an end of a seat belt at its free end. This arm is actuated by a cable connected to a door checker in such a manner that the arm may rotate forward when the door is opened and rotate rearward when the door is closed. The device incorporates spring members to allow some freedom of movement to the arm for its satisfactory operation. The forward movement of the arm is achieved by the cable and the reverse movement of the arm is achieved by a restoring force of a tension coil spring.

However, according to this prior art seat belt forwarding device, it is difficult to achieve a smooth movement of the arm since it much depends on the initial tension of the cable which is difficult to control. Also, the use of wire cable for actuation requires fairly complicated wire cable arrangement, and considerable efforts are required for its assembly.

It is conceivable to use an electric motor to actuate the arm carrying an end of a seat belt. In this case, an electric motor is typically mounted under the seat, and the power transmission mechanism for transmitting power from the electric motor to the seat belt forwarding device tends to be complicated. As a result, considerable efforts are required for its assembly and/or the cushioning capability of the seat may be impaired by taking up space which is otherwise allocated for cushioning material.

BRIEF SUMMARY OF THE INVENTION

In view of such problems of the prior art, a primary object of the present invention is to provide a seat belt forwarding device which is compact in structure and easy to assemble.

A second object of the present invention is to provide a seat belt forwarding device which is highly reliable and capable of smooth operation.

These and other objects of the present invention can be accomplished by providing a seat belt forwarding device having a seat belt forwarding arm which has a base end pivotally mounted on a side of a rear part of a vehicle seat and a free end carrying an end of a seat belt, and can rotate between a waiting position in which the seat belt forwarding arm extends rearward from the seat and an operative position in which the seat belt forwarding arm extends forward along a side of the seat, comprising: a driven member provided with a first pulley and supported by a fixed frame of the vehicle seat at a side of a rear part of the seat so as to be rotatable around an axial line extending laterally of a vehicle body; a power unit supported by the fixed frame and having a second pulley at its output end extending substantially in a same plane as that of the first pulley so as to be rotatable around an axial line extending laterally of the vehicle body; an endless belt passed around the first and second pulleys; an intermediate member rotatably and coaxially supported relative to the driven member in such a manner that a drive force may be transmitted directly from the driven member to the intermediate member in a first direction but by way of a first spring member in a second direction; and an arm supporting member rotatably and coaxially supported relative to the intermediate member in such a manner that a drive force may be transmitted from the intermediate member to the arm supporting member by way of a second spring member in the first direction but directly in the second direction, the seat belt forwarding arm being fixedly secured to the arm supporting member at its base end; one of the first and second directions corresponding to either one of the waiting and operative positions while the other of the first and second directions corresponds to the other of the waiting and operative positions.

Typically, the desired relationship between the intermediate member and the driven member may be accomplished by using a torsion coil spring and a pin-slot arrangement. Likewise, the desired relationship between the arm supporting member and the intermediate member may be accomplished by using a torsion coil spring and a pin-slot arrangement.

Thus, the arm may be moved away from the position imposed by the power unit by deforming either one of the spring members, and the power unit as well as the members placed in the path of power transmission is not subjected to any excessive load, and the reliability and durability of the system may be ensured. Further, by using an endless belt and a pair of pulleys for transmitting power from the power unit to the three members, the power unit may be placed along the side of the seat taking up a minimum space without in any way impairing the quality of the seat.

In particular, by using a connecting frame interposed between the driven member and the intermediate member in a mutually rotatable manner, the connecting frame being provided with an extension for mounting the power unit thereon, and providing the driven member with a central collar which is passed through central bores of the intermediate member and the arm supporting member, the collar being provided with means for joining the three members together without restricting rotational movement therebetween, it is possible to combine the power unit and the three members as a single sub-assembly, and the assembly work is thus significantly facilitated. Also, if each end of the spring member is engaged to a corresponding one of the members against both circumferential and axial displacement, this will contribute to the formation of the sub-assembly without complicating the overall structure.

This sub-assembly may be easily mounted on a fixed frame of a vehicle seat by using a threaded bolt passed through a central bore of the central collar and securely threaded with a corresponding threaded hole provided in the fixed frame.

According to a preferred embodiment of the present invention, the connecting frame is further provided with a cover surrounding at least part of the endless belt passed around the first pulley, an inner circumferential surface of the cover being provided with a projection projecting toward the endless belt leaving a small gap therebetween so that the endless belt may be prevented from being displaced from the pulleys.

Further, by providing means for restricting relative rotation between the connecting frame and the intermediate member within a certain range, the angular movement of the arm may be maintained within a prescribed range even when the power unit went out of control.

In order to ensure proper tensioning of the endless belt without complicating the assembly process, the power unit and the extension of the connecting frame may be connected with each other with a pin slot connection extending in a direction to eliminate a slack in the endless belt, a spring member being engaged between a fixed part of the seat and the power unit to urge the power unit away from the connecting frame.

According to a certain aspect of the present invention, the first spring member consists of a torsion coil spring having a relatively large diameter, and the second spring member consists of a torsion coil spring having a relatively small diameter and received in the first spring member in a coaxial relationship. Thus, the overall size of the seat belt forwarding device can be reduced.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
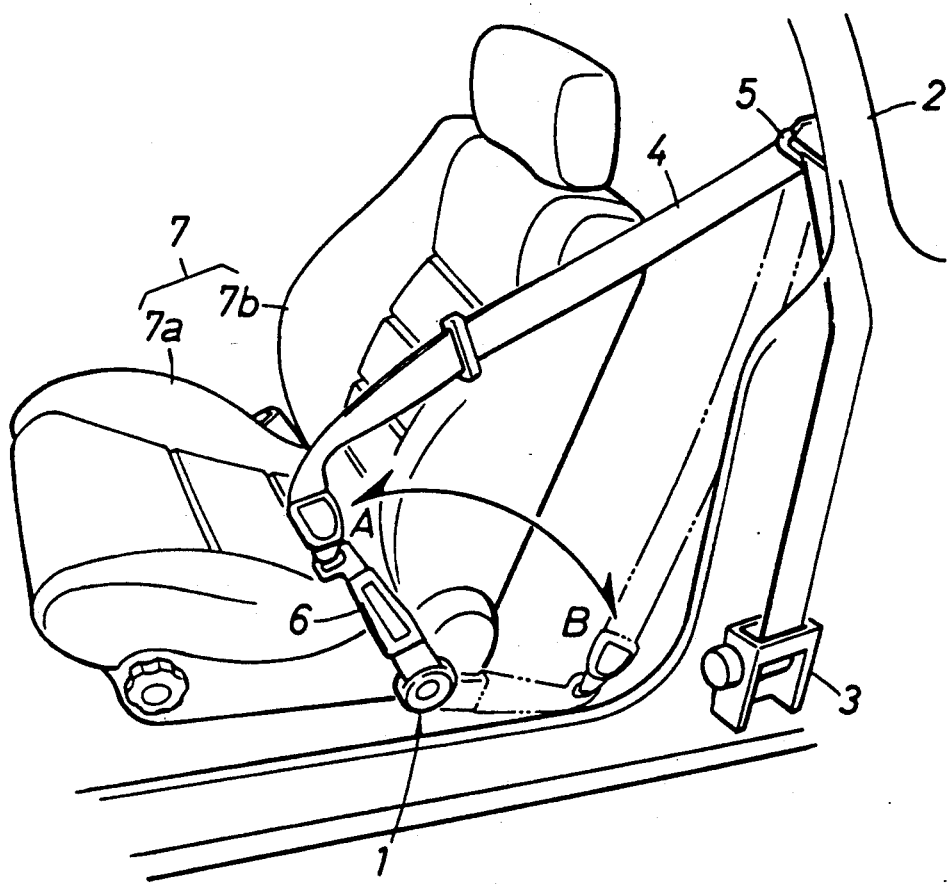
FIG. 1 is a perspective view of a vehicle front seat equipped with a preferred embodiment of the seat belt forwarding device of the present invention.

FIG. 1 is a perspective view of a front seat of an automobile to which a seat belt forwarding device of the present invention is applied. A seat belt 4 extending upwards from a retractor 3 mounted at a lower end of a center pillar 2 is passed through a through ring 5 provided in an upper part of the center pillar 2, and then extends downwards to a point where it is engaged to a free end of a seat belt forwarding arm 6.

The seat belt forwarding arm 6 is pivotally mounted, at its base end, on a frame portion of the front seat 7 near the hinge portion between the main part 7a and a back rest 7b of this front seat 7. When the door (not shown in the drawing) is closed, the seat belt forwarding arm 6 is at the active or operative position A indicated by solid lines in FIG. 1. When the door is opened, the seat belt forwarding arm is rotated to the waiting position B indicated by imaginary lines.

In this way, when the door is opened, the seat belt forwarding arm 6 moves the seat belt to a position extending along the center pillar 2 so as not to obstruct a vehicle occupant getting into and out of the front or rear seat. When the door is closed, the seat belt 4 is moved to a position to which the vehicle occupant can readily reach.

Figure 2:
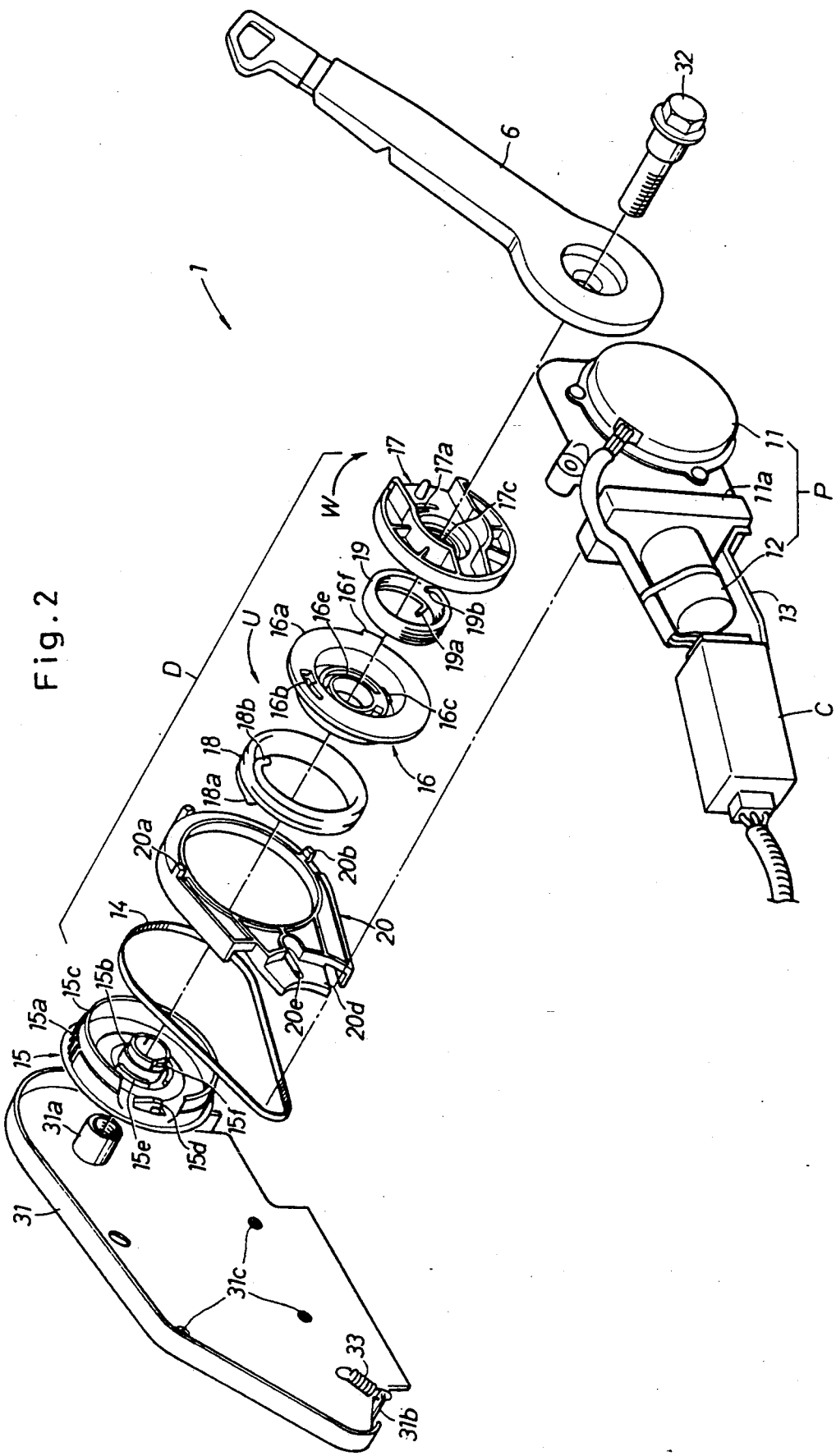
FIG. 2 is an exploded perspective view of the seat belt forwarding device.

Referring to FIG. 2, the seat belt forwarding device 1 comprises a power unit P integrally combining a reduction gear unit 11 and an electric motor 12, a relay circuit unit C for controlling the operation of the power unit P, and a damper unit D for transmitting the driving force from the power unit P to the seat belt forwarding arm 6. The relay circuit unit C is integrally combined with the power unit P by way of an extension member 13 fixedly secured to a housing 11a of the reduction gear unit 11.

Figure 3:
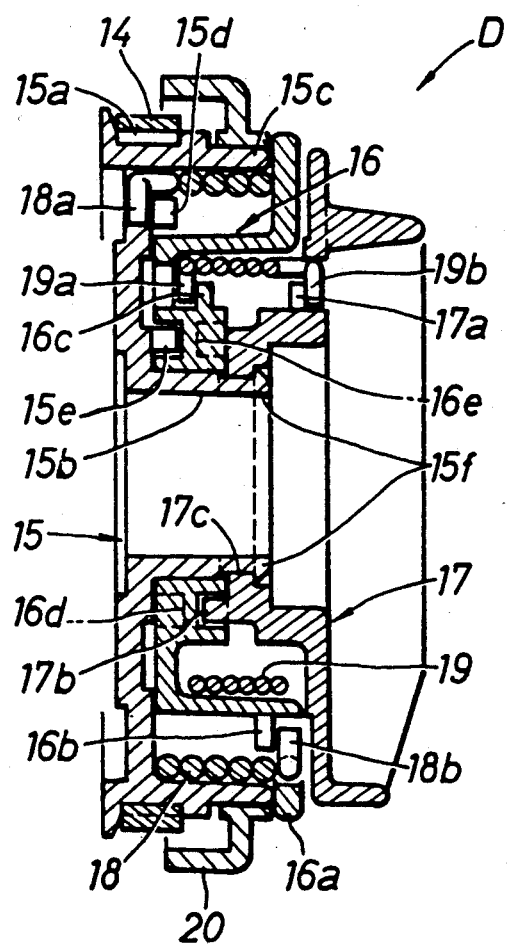
FIG. 3 is a sectional view of the damper unit of the seat belt forwarding device.

Referring to both FIGS. 2 and 3, the damper unit D comprises a driven member 15 provided with a pulley 15a for transmitting the driving force of the power unit P to the seat belt forwarding arm 6 via an endless cogged belt 14, an intermediate member 16 rotatably fitted onto an inner collar 15b provided centrally and coaxially in the driven member 15, and an arm support member 17 likewise rotatably fitted onto the same inner collar 15b of the driven member 15 and carrying the seat belt forwarding arm 6.

A first torsion coil spring 18 of a relatively large diameter is interposed between the driven member 15 and the intermediate member 16 so as to urge the intermediate member 16 in the direction indicated by the arrow V relative to the driven member 13. One end 18a of the first torsion coil spring 18 is engaged to a projection 15d provided in a side wall of the driven member 15, and the other end 18b of the first torsion coil spring 18 is engaged to a projection 16b provided in a flange 16a of the intermediate member 16, the first torsion coil spring 18 being placed in a prestressed condition.

A second torsion coil spring 19 of a relatively small diameter is interposed between the intermediate member 16 and the arm supporting member 17 so as to urge the arm supporting member 17 in the direction indicated by the arrow W relative to the intermediate member 16. The spring force of the second torsion coil spring 19 is smaller than that of the first torsion coil spring 18. One end 19a of the second torsion coil spring 19 is engaged to a projection 16b provided in a side wall of the intermediate member 16, and the other end 19b of the second torsion coil spring 19 is engaged to a projection 17a formed in a side wall of the arm supporting member 17, the second torsion coil spring 19 being placed in a prestressed condition.

For the purpose of limiting the ranges of relative angular movement between the driven member 15 and the intermediate member 16 and between the intermediate member 16 and the arm supporting member 17, each face of the intermediate member 16 is provided with an arcuate groove 16d or 16e extending over a prescribed angular range, and the opposing faces of the driven member 15 and the arm supporting member 17 are provided with projections 15e and 17b which fit into the associated arcuate grooves 16d and 16e, respectively.

Each of the projections 15d and 16b of the driven member 15 and the intermediate member 16 is L-shaped so that the ends 18a and 18b of the first torsion coil spring 18 may be engaged with the corresponding projections 15d and 16b not only in the circumferential direction but also in the axial direction (Refer to the projection on 15d in FIG. 2). Likewise, each of the projections 16c and 17a of the intermediate member 16 and the arm supporting member 17 is L-shaped so that the ends 19a and 19b of the second torsion coil spring 19 may be engaged with the corresponding projections 16c and 17a not only in the circumferential direction but also in the axial direction. Further, a pair of elastically deformable pawl 15f provided in the inner collar 15b of the driven member 15 engage with a peripheral part of a central bore 17c of the arm supporting member 17 so as to integrally join the three members 15, 16 and 17 together without restricting relative rotation between them.

A connecting frame member 20 surrounds an outer collar 15c axially extending from the pulley 15a of the driven member 15, and is held between the pulley 15a and a radial flange 16a of the intermediate member 16 for joining the three members 15, 16 and 17 to the power unit P.

Figure 5:
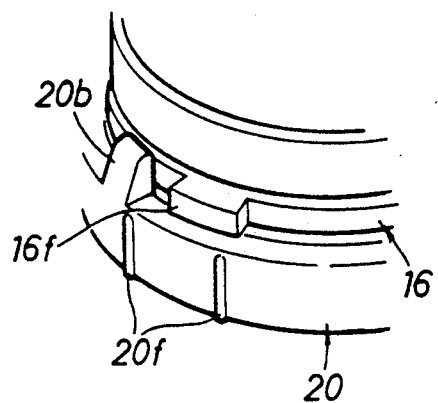
FIG. 5 is a fragmentary perspective view of a part of the damper unit.

The face of the connecting frame member 20 opposing the flange 16a of the intermediate member 16 is provided with a pair of projections 20a extending axially therefrom to limit the range of angular movement of the intermediate member 16 in cooperation with projections 16f extending radially from the flange 16a of the intermediate member 16 as illustrated in FIG. 5.

Figure 4:
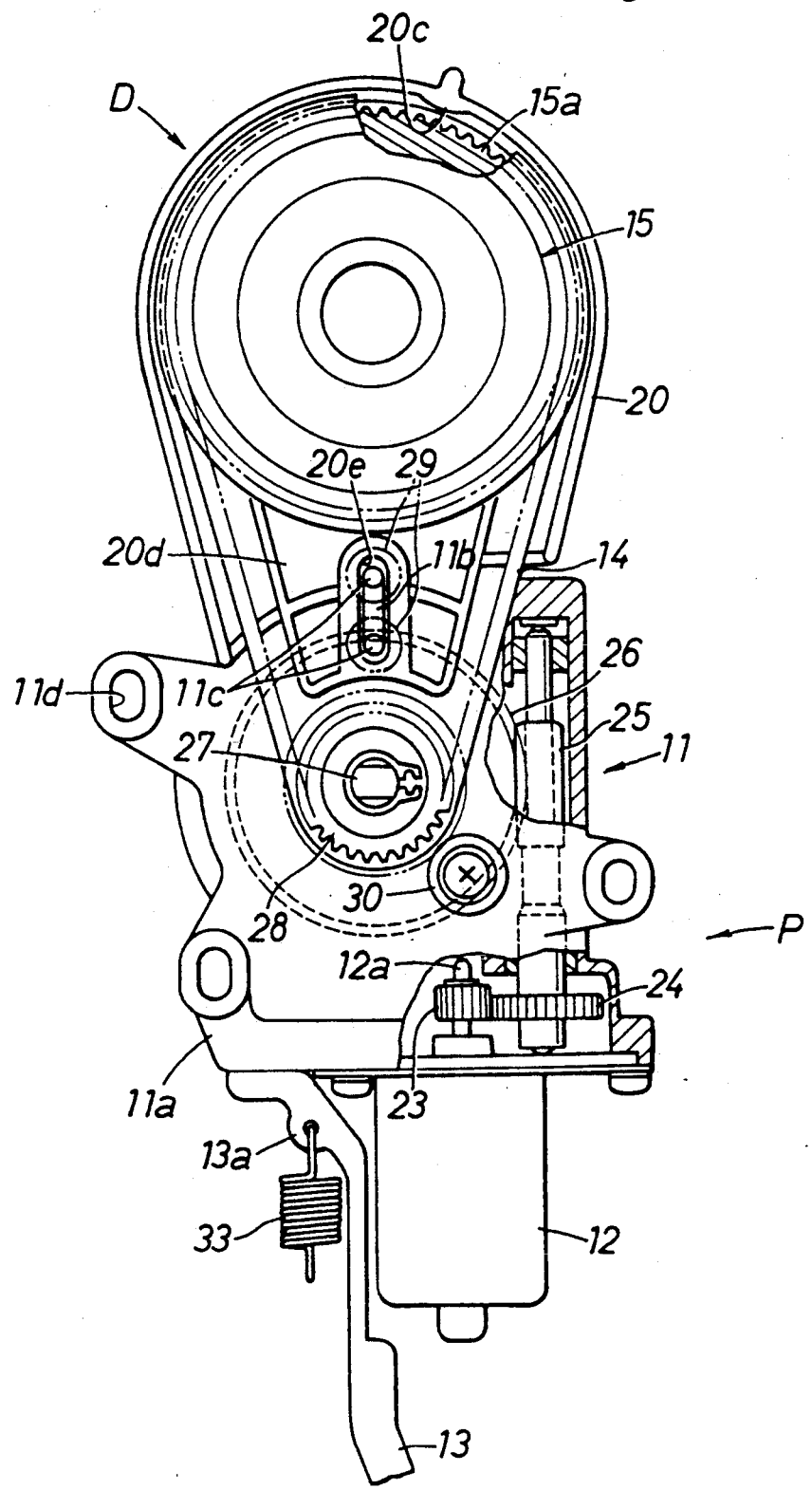
FIG. 4 is a partly broken-away side view of the seat belt forwarding device as seen from the mounting surface of the seat.

Referring to FIG. 4, the reduction gear unit 11 comprises a small helical spur gear 23 fixedly secured to an output shaft of the electric motor 12, a large helical spur gear 24 meshing therewith, a worm 25 integrally formed with the large helical spur gear 24, and a worm wheel gear 26 meshing with the worm 25. A small pulley 28 is integrally attached to a gear unit output shaft 27 which extends integrally and coaxially from the worm wheel gear 26 at right angle relative to motor output shaft 12a.

The damper unit D having the structure as described above may be assembled to the power unit P in the following manner. First of all, the motor 12 is activated to place the reduction gear unit 11 in the waiting position in which the seat belt forwarding arm 6 extends to the rear of the front seat 7 as indicated by the imaginary lines B in FIG. 1. At the same time, the endless cogged belt 14 is passed around the pulley 15a of the driven member 15, and a radial projection 16f of the intermediate member 16 is centrally aligned with marks 20f formed on an outer circumferential part of the connecting frame member 20 as illustrated in FIG. 5. Then, the endless belt 14 is passed around the small pulley 28. Thus, the phase of angular relationship between the reduction gear unit 11 and the seat belt forwarding arm 6 may be placed in a mutually matched position.

The connecting frame member 20 is provided with a radial extension 20d having a slot 20e passed therethrough. By engaging this slot 20e with a projection 11c formed in a projection 11b extending from a housing 11a of the gear reduction unit 11, and fitting an E-ring or a C-ring 29 onto the projection 11c, the power unit P and the damper unit D can be combined as a single sub-assembly.

Thereafter, a retainer roller 30 is mounted on the housing 11a of the reduction gear unit 11 to define a small gap between the retainer roller 30 and the outer circumferential surface of the endless belt 14 passed around the small pulley 28. The retainer roller 30 prevents the endless belt 14 from being disengaged from the pulleys 15 and 28 in cooperation with a projection 20c formed in the connecting frame member 20 so as to define a small gap between the projection 20c and the outer circumferential surface of the endless belt 14 passed around the large pulley 15a. It should be noted that the phase relationship between the small and large pulleys 28 and 15a must be maintained at all times and the skipping of the teeth in the engagement between the endless belt 14 and the small pulley 28 and between the endless belt 14 and the large pulley 15a must be avoided in order to ensure the proper operation of the seat belt forwarding device.

In this assembled condition, there is a slight radial play between the power unit P and the damper unit D, and there is a slight slack in the endless belt 14.

Figure 6:
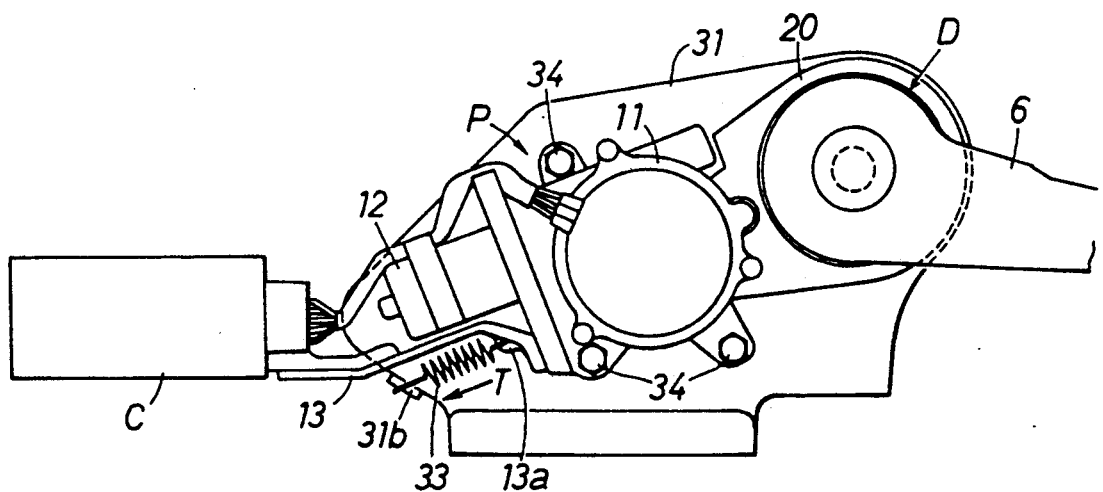
FIG. 6 is a simplified side view of the seat belt forwarding device.

Further, a boss 31a projecting from a bracket 31 fixedly secured to a side surface of the front seat 7 is fitted into the bore of the inner collar 15b of the driven member 15, and an anchor bolt 32 is passed through the seat belt forwarding arm 6 and the damper unit D, and securely threaded into the inner bore of the boss 31a. Then, an extension coil spring 33 is engaged between engagement pieces 13a and 31b provided in the extension member 13 and the bracket 31 to urge the power unit P away from the damper unit D as indicated by the arrow T in FIG. 6 and apply a suitable tension to the endless belt 14. By finally threading mounting screws 34 passed through three mounting holes 11d provided in the housing 11a of the reduction gear unit 11 into corresponding tapping screw holes 31c in the bracket 31, the power unit P along with the damper unit D is fixedly secured to the bracket 31 or the side of the front seat 7.

Now the control circuit for this seat belt forwarding device is described in the following with reference to FIG. 7.

A positive terminal of an on-board battery B is connected to a first terminal leading to a +12-volt line of a printed circuit board CB via a fuse F. One of the terminals of a door switch DS is connected to a ground line G, and the other terminal is connected to a second terminal of the circuit board CB. A room light RL is connected between the other terminal of the door switch DS and the positive terminal of the battery B. A third terminal of the circuit board CB connected to a 0-volt line is connected to the ground line G.

A rotary switch RS integrally mounted on an axial end surface of the worm wheel gear 26 at the final end of the power unit P has a common terminal connected to a fourth terminal of the circuit board CB leading to the +12-volt line. An operative position terminal of the rotary switch RS is connected a fifth terminal of the circuit board CB while a waiting position terminal of the rotary switch RS is connected to an eighth terminal of the circuit board CB.

The two terminals of the electric motor 12 are connected to sixth and seventh terminals of the printed circuit board CB. A diode D8 and a coil of a door switch relay DR are connected in series between the second terminal and the +12-volt line.

A common terminal of the door switch relay DR is connected to the 0-volt line, and a diode D1, a transistor T1 and a coil of a first relay MR1 for motor control are connected in series between a normally closed contact of the door switch relay DR and the fifth terminal. A diode D3, a transistor T2 and a coil of a second relay MR2 for motor control are connected in series between a normally open contact of the door switch relay DR and the eighth terminal.

A common terminal of the first relay MR1 is connected to the sixth terminal, and a normally open contact of this relay MR1 is connected to the +12-volt line while a normally closed contact thereof is connected to the 0-volt line. A common terminal of the second relay MR2 is connected to the seventh terminal, and a normally open contact of this relay MR2 is connected to the +12-volt line while a normally closed contact thereof is connected to the 0-volt line. A diode D5, D6 or D7 is connected across the coil of each of the relays MR1, MR2 and DR to eliminate reactive pulses.

A resistor R3, a capacitor C1 and a resistor R1 are connected in series between the fifth terminal and the base of the transistor T1. A resistor R4, a zener diode ZD1, a diode D2, and a resistor R1 are connected between the nodes of the serially connected fifth terminal, resistor R3, capacitor C1, a resistor R1, and the base of the transistor T1, respectively, and the emitter of the transistor T1.

A resistor R7, a capacitor C2 and a resistor R6 are connected in series between the eighth terminal and the base of the transistor T2. A resistor R8, a zener diode ZD2, a diode D4, and a resistor R5 are connected between the nodes of the serially connected eighth terminal, resistor R7, capacitor C2, a resistor R6, and the base of the transistor T2, respectively, and the emitter of the transistor T2.

Now the operation of this seat belt forwarding device is described in the following.

Figure 7:
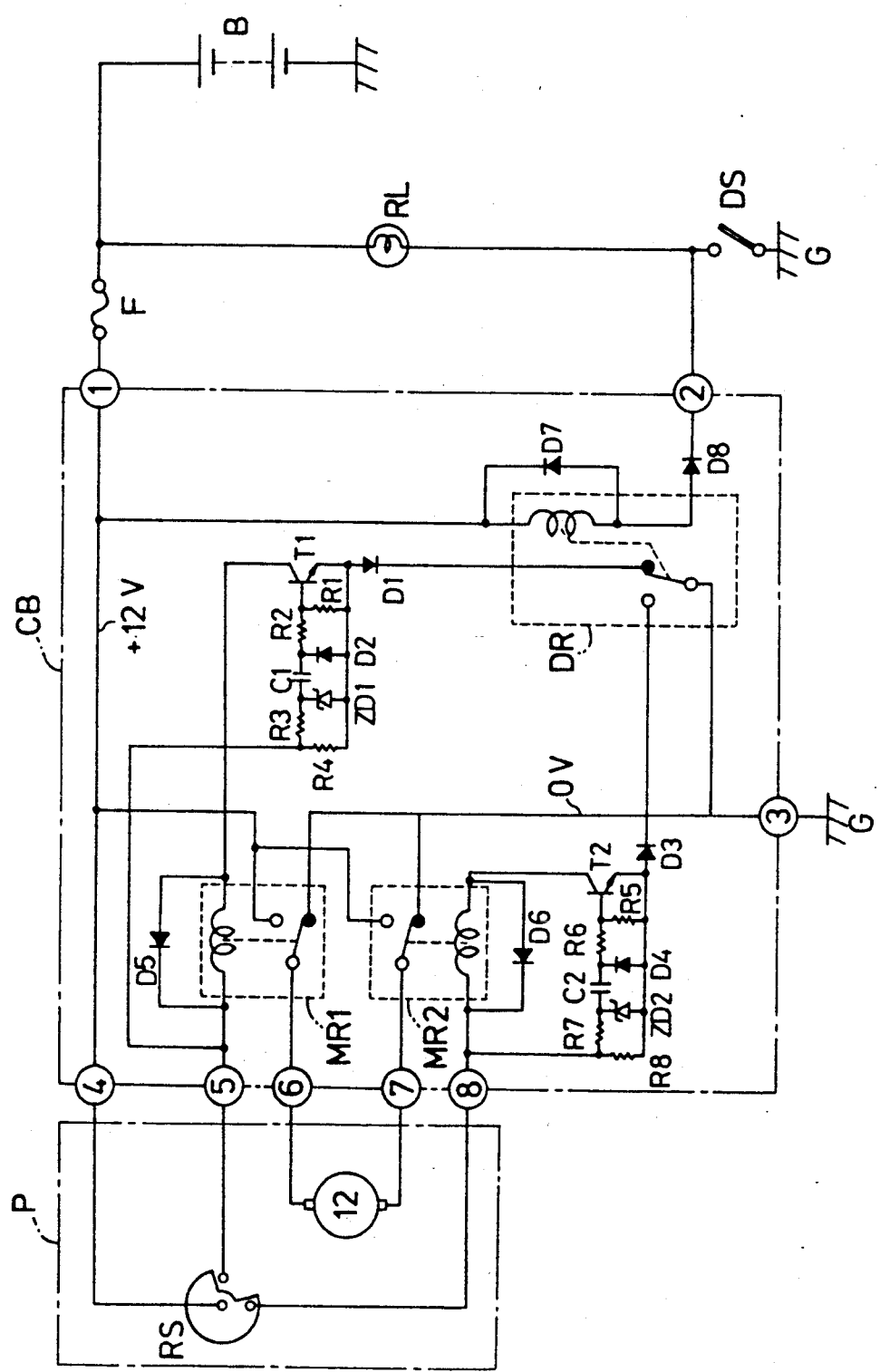
FIG. 7 is a circuit diagram of the control unit for the seat belt forwarding device.

In the condition illustrated in FIG. 7, the door switch DS is open or the door is closed. The rotary switch RS is in a position corresponding to the operative condition of the seat belt forwarding arm 6.

When the door is opened, the door switch DS is closed, and the room light RL lights up. At the same time, the coil of the door switch relay DR is energized, and the normally open contact and the common terminal are electrically connected to each other. Meanwhile, since the common contact and the waiting position contact of the rotary switch RS are electrically connected to each other, electric current flows through a path extending through the +12-volt line, the fourth terminal, the rotary switch RS, the eighth terminal, the resistor R7, the capacitor C2, the resistor R6, and the base of the transistor T2, and this brings the transistor T2 into a conductive state. This in turn causes the coil of the second relay MR2 to be energized, and the common terminal and the normally open contact of this relay are electrically connected to each other.

Since the common contact and the operative position contact of the rotary switch RS are disconnected from each other, and the normally closed contact of the door switch relay is open, the coil of the first relay MR1 is de-energized, and the normally close contact of this relay is closed. Therefore, the seventh terminal leading to the electric motor 12 is connected to the positive terminal of the battery B while the sixth terminal also leading to the electric motor 12 is connected to the ground line G, and the electric motor 12 rotates in such a direction as to rotate the seat belt forwarding arm 6 backward to its waiting position.

The rotation of the electric motor 12 also causes the rotary switch RS to rotate counter-clockwise. When the rotary switch RS has turned to the position where the common contact and the operative position contact are electrically connected, and the common contact and the waiting position contact are separated from each other, the coil of the second relay MR2 is de-energized, and the electric motor 12 stops rotating.

Meanwhile, the capacitor C2 is electrically charged by the current drawn from the line leading to the base of the transistor T2, and the transistor T2 is eventually shut off as the voltage across the capacitor C2 increases to a certain level. In other words, the coil of the second relay MR2 is de-energized and the motor stops 12 after elapsing of a certain time period irrespective of the condition of the rotary switch RS.

When the door is closed, the door switch relay DR is de-energized, and the normally closed contact of this relay is closed. Since the operative position contact of the rotary switch RS is closed while the waiting position contact thereof is open at this time, the transistor T1 is in a conductive state in the same way as described above, and the coil of the first relay MR1 is energized while the coil of the second relay MR2 is de-energized. This causes the sixth terminal leading to the electric motor 12 to be connected to the positive terminal of the battery B while the sixth terminal also leading to the electric motor 12 is connected to the ground line G, and the electric motor 12 is thereby rotated in the reverse direction until it is stopped either by the clockwise rotation of the rotary switch RS or by the elapsing of a certain time period determined by the electric charging of the capacitor C1.

Suppose that the movement of the seat belt forwarding arm 6 from the rear position indicated by B in FIG. 1 to the front position A is obstructed by some object, the first torsion coil spring 18 between the driven member 5 and the intermediate member 16 is twisted so as to accommodate the driving force applied to the driven member 15 and allow the seat belt forwarding arm 6 to be in an intermediate position imposed by the obstructing object. Therefore, the power unit P or the seat belt forwarding arm 6 is prevented from being damaged. The electric motor 12 is stopped after elapsing of a certain time period after such an occurrence, and is therefore free from any damages due to overloading.

When the electric motor 12 has failed and is unable to drive the seat belt forwarding arm 6 from the position B, it is possible to force the seat belt forwarding arm 6 to the front or operative position A by rotating the seat belt forwarding arm 6 against the spring force of the second torsion coil spring 19 engaged between the intermediate member 16 and the arm supporting member 17. Since the spring force of the second torsion coil spring 19 is relatively small, the seat belt forwarding arm 6 may be forced to its operative position without much difficulty. Further, since the biasing force of the first torsion coil spring 18 is relatively strong, the seat belt can be worn without involving any instability under normal condition.

Advantages of the present embodiment may be summarized as given in the following:

(1) The use of an electric motor in combination with an endless belt which may consist of a cogged belt ensures a smooth movement of the seat belt forwarding arm in either direction.

(2) Proper tensioning of the power transmitting endless belt can be ensured without complicating the assembly process by using the pin-slot engagement and the spring member for urging the power unit away from the damper unit whose rotational center is fixedly secured.

(3) Various component units (i.e., the power unit, the damper unit and the control unit) can be conveniently combined as a sub-assembly which facilitates the handling of the various units and the overall assembly process.

(4) The advantageous layout of the power unit and the damper unit would not affect the seat design in any substantial manner as it takes up a minimum space in the seat structure, and a favorable seat design can be maintained.

(5) Provision of a projection and a retainer roller ensures proper engagement between the endless belt and the pulleys (all of them may be provided with teeth for secure meshing therebetween), and the phase relationship of the various elements may be ensured at all times.

(6) Since the limits of angular movement of the intermediate member which serves as the reference for the position of the torsion coil spring are defined by stopper projections provided in the connecting frame member, any over-running of the electric motor may be properly accommodated by the torsion coil springs, and the seat belt forwarding arm may be maintained at proper angular positions at all times.

(7) Since one of the torsion coil springs is received in the other, the axial dimension of the damper unit can be minimized.

(8) The provision of the inner collar to the driven member for joining the three key members of the damper unit contributes to the simplification of the assembly process.

Although the present invention has been described in terms of a preferred embodiment thereof, it is obvious to a person skilled in the art that various alterations and modifications are possible without departing from the scope of the present invention which is set forth in the appended claims.

What I claim is:

1. A seat belt forwarding device having a seat belt forwarding arm which has a base end pivotally mounted on a side of a rear part of a vehicle seat and a free end carrying an end of a seat belt, and can rotate between a waiting position in which said seat belt forwarding arm extends rearward from said seat and an operative position in which said seat belt forwarding arm extends forward along a side of said seat, comprising:

a driven member provided with a first pulley and supported by a fixed frame of said vehicle seat at a side of a rear part of said seat so as to be rotatable around an axial line extending laterally of a vehicle body;

a power unit supported by said fixed frame and having a second pulley at its output end extending substantially in a same plane as that of said first pulley so as to be rotatable around an axial line extending laterally of said vehicle body;

an endless belt passed around said first and second pulleys;

an intermediate member rotatably and coaxially supported relative to said driven member in such a manner that a drive force may be transmitted directly from said driven member to said intermediate member in a first direction but by way of a first spring member in a second direction; and an arm supporting member rotatably and coaxially supported relative to said intermediate member in such a manner that a drive force may be transmitted from said intermediate member to said arm supporting member by way of a second spring member in said first direction but directly in said second direction, said seat belt forwarding arm being fixedly secured to said arm supporting member at its base end;

one of said first and second directions corresponding to either one of said waiting and operative positions while the other of said first and second directions corresponds to the other of said waiting and operative positions.

2. A seat belt forwarding device, comprising:

a driven member provided with a first pulley and rotatably supported by a fixed frame of a vehicle seat at a side of a rear part of said seat;

a power unit having a second pulley at its output end extending substantially in a same plane as that of said first pulley so as to be rotatable around an axial line extending laterally of said vehicle body;

an endless belt passed around said first and second pulleys;

an intermediate member rotatably and coaxially supported relative to said driven member, relative angular movement between said driven member and said intermediate member being restricted to a certain angle determined by a first arcuate slot provided in one of said intermediate and driven members and a first projection provided in the other of said members and received in said first arcuate slot;

a first torsion coil spring engaged between said intermediate member and said driven member urging said two members to an extreme relative position defined by said first projection and said first arcuate slot;

an arm supporting member rotatably and coaxially supported relative to said intermediate member, relative angular movement between said intermediate member and said arm supporting member being restricted to a certain angle determined by a second arcuate slot provided in one of said arm supporting and intermediate members and a second projection provided in the other of said members and received in said second arcuate slot;

a second torsion coil spring engaged between said arm supporting member and said intermediate member urging said two members to an extreme relative position defined by said second projection and said second arcuate slot;

a seat belt forwarding arm carrying an end of a seat belt at its free end and fixedly secured to said arm supporting member at its base end; and a control unit for controlling said power unit so as to move said seat belt forwarding arm between a waiting position in which said seat belt forwarding arm extends rearward from said seat and an operative position in which said seat belt forwarding arm extends forward along a side of said seat;

one of said first and second directions corresponding to either one of said waiting and operative positions while the other of said first and second directions corresponds to the other of said waiting and operative positions.

3. A seat belt forwarding device according to claim 2, wherein said driven member is provided with a central collar which is passed through central bores of said intermediate member and said arm supporting member, said collar being provided with means for joining said three members together without restricting rotational movement therebetween.

4. A seat belt forwarding device according to claim 3, further comprising a threaded bolt passed through a central bore of said central collar and securely threaded with a corresponding threaded hole provided in a fixed frame of said seat.

5. A seat belt forwarding device according to claim 3, further comprising a connecting frame interposed between said driven member and said intermediate member in a mutually rotatable manner, said connecting frame being provided with an extension for mounting said power unit thereon.

6. A seat belt forwarding device according to claim 5, further comprising means for restricting relative rotation between said connecting frame and said intermediate member within a certain range.

7. A seat belt forwarding device according to claim 5, wherein said power unit and said extension of said connecting frame are connected with each other with a pin slot connection extending in a direction to eliminate a slack in said endless belt, a spring member being engaged between a fixed part of said seat and said power unit to urge said power unit away from said connecting frame.

8. A seat belt forwarding device according to claim 5, wherein said connecting frame is further provided with a cover surrounding at least part of said endless belt passed around said first pulley, an inner circumferential surface of said cover being provided with a projection projecting toward said endless belt leaving a small gap therebetween.

9. A seat belt forwarding device according to claim 2, wherein said first spring member consists of a torsion coil spring having a relatively large diameter, and said second spring member consists of a torsion coil spring having a relatively small diameter and received in said first spring member in a coaxial relationship.

10. A seat belt forwarding device according to claim 2, wherein each end of said spring member is engaged to a corresponding one of the members against both circumferential and axial displacement.

* * * * *